(12) United States Patent
Wah

(10) Patent No.: US 10,700,868 B2
(45) Date of Patent: Jun. 30, 2020

(54) SECURITY SYSTEMS AND METHODS FOR ELECTRONIC DEVICES

(71) Applicant: Chng Weng Wah, Singapore (SG)

(72) Inventor: Chng Weng Wah, Singapore (SG)

(*) Notice: Subject to any disclaimer, the term of this patent is extended or adjusted under 35 U.S.C. 154(b) by 0 days.

(21) Appl. No.: 15/925,710

(22) Filed: Mar. 19, 2018

(65) Prior Publication Data
US 2019/0288845 A1  Sep. 19, 2019

(51) Int. Cl.
H04L 9/32 (2006.01)
G06Q 30/06 (2012.01)
G06F 21/88 (2013.01)
H04W 12/06 (2009.01)
G06K 7/14 (2006.01)
G06F 16/955 (2019.01)
G06F 21/42 (2013.01)

(52) U.S. Cl.
CPC ........ *H04L 9/3226* (2013.01); *G06F 16/9554* (2019.01); *G06F 21/42* (2013.01); *G06F 21/88* (2013.01); *G06K 7/1439* (2013.01); *G06Q 30/06* (2013.01); *H04L 9/3236* (2013.01); *H04W 12/06* (2013.01)

(58) Field of Classification Search
None
See application file for complete search history.

(56) References Cited

U.S. PATENT DOCUMENTS

| 6,104,281 A | 8/2000 | Heinrich | |
| 6,615,353 B1 * | 9/2003 | Hashiguchi | G06F 21/34 380/262 |
| 6,947,941 B1 | 9/2005 | Koon | |
| 7,275,686 B2 | 10/2007 | Estakhri | |
| 7,482,929 B2 | 1/2009 | Bowers | |

(Continued)

FOREIGN PATENT DOCUMENTS

| WO | 0002009 | 1/2000 |
| WO | WO 2009/102279 | 8/2009 |

OTHER PUBLICATIONS

New Point of Sale Activation Technology by Disa Digital Safety USA is Awarded First Place at the 2017 (R) Tech Asset Protection: Innovation Awards by the Retail Industry Leaders Assocaition ("RILA").

(Continued)

*Primary Examiner* — Carlos Garcia
(74) *Attorney, Agent, or Firm* — Sheppard, Mullin, Richter & Hampton LLP

(57) ABSTRACT

Systems and methods product security include: generating a unique activation code, product identification code, and product scan code for electronic products to be protected and assigning these security codes to their corresponding products; generating an unlock code for each product; embedding the unlock code into the electronic product, and locking the electronic product to be protected to create a locked electronic product; and affixing the unique product scan codes to their corresponding products. At the point of purchase the unique product scan code is scanned to identify the unique activation code for the purchased product. The purchaser receives the activation code assigned to the locked product and enters it. A hash string generated from the activation code is compared to the unlock code to determine whether they are a match.

34 Claims, 11 Drawing Sheets

(56) References Cited

U.S. PATENT DOCUMENTS

| | | |
|---|---|---|
| 7,616,118 B2 | 11/2009 | Chng |
| 7,797,164 B2 | 9/2010 | Junger et al. |
| 8,396,748 B2 | 3/2013 | Shintani |
| 8,655,309 B2 | 2/2014 | Smith |
| 8,985,465 B2 | 3/2015 | Atkinson |
| 9,136,957 B1 | 9/2015 | Napolitano |
| 9,436,770 B2 | 9/2016 | Hattrup |
| 9,641,957 B2 | 5/2017 | Raleigh |
| 2003/0092435 A1 | 5/2003 | Boivin |
| 2010/0164681 A1 | 7/2010 | Harris |
| 2011/0153441 A1 | 6/2011 | Smith |
| 2012/0124388 A1 | 5/2012 | Chng et al. |
| 2014/0201094 A1* | 7/2014 | Herrington ........ G06K 9/00577 705/317 |
| 2014/0207599 A1 | 7/2014 | Junger |
| 2016/0217356 A1 | 7/2016 | Wesby |
| 2017/0032382 A1 | 2/2017 | Shulman |
| 2018/0204260 A1* | 7/2018 | McGregor ......... G06Q 30/0609 |
| 2018/0365453 A1 | 12/2018 | Hartway |

OTHER PUBLICATIONS

International Search Report and Written Opinion dated Jul. 11, 2019 for International Application No. PCT/IB2019/000272, filed Mar. 19, 2019.

Non-final Office Action dated Jul. 18, 2014 for U.S. Appl. No. 12/945,883, filed Nov. 14, 2010.

Final Office Action dated Mar. 27, 2015 for U.S. Appl. No. 12/945,883, filed Nov. 14, 2010.

\* cited by examiner

SECURITY SYSTEMS AND METHODS FOR ELECTRONIC DEVICES

TECHNICAL FIELD

The disclosed technology relates generally to device security, and more particularly, some embodiments relate to systems and methods for administering device security.

DESCRIPTION OF THE RELATED ART

Theft of electronic devices remains an important concern for device manufacturers, resellers and law enforcement personnel. Advances in technology, enhancements to the feature set, and normal consumer desires have driven the demand for the latest and greatest electronic devices to an all-time high. From pirates on the seas to porch pirates, and everything in between, the theft of electronic devices has reached epidemic proportions. In fact, the National Retail Federation has estimated retail return fraud losses in the range of $15 billion for 2017.

At the retail level, physical security measures include locked display cases, RFID tags, and other traditional security mechanisms. These measures may help to reduce incidents of shoplifting or employee pilfering, but they have not eliminated the problem. Thieves have found a way to defeat these measures as well. Also, it can be impractical as well as costly to provide physical security measures across a merchant's entire inventory. Also, while these measures may provide some help with individual products at the retail level, they do not address larger scale theft such as at the pallet or container level. Regardless of the manner in which a device is stolen, once it is stolen, there is little that can be done.

Some Digital Rights Management (DRM) and other digital security techniques may protect content, but is limited in its ability to protect the devices themselves. DRM systems typically provide access control to restrict and manage access to digital content, or otherwise control distribution, use and modification of copyrighted works.

Some solutions require authentication and $3^{rd}$-party remote activation of devices as a means of protecting against device theft. For example, with cellular telephones, some current solutions use an ESN or UPC code to accommodate the purchase of the device and then further require identification of the user such as name, birth date, etc. to be input into the system. A central processor receives the identifying information from the merchant indicating that a valid sale of the device has taken place. This information can then be provided to the cellular carrier. The purchaser contacts the carrier to request activation of the device and provides device identification information as well as his or her personal information. The carrier checks its database to determine whether the identified device has been approved for activation (i.e., whether it was subject to a valid sale). This is a cumbersome process requiring the user to provide personal identifying information to the merchant and requiring his personal information to be transferred along with device identification through various channels to the carrier. It also requires the user (or the merchant on the user's behalf) to undertake additional activation steps.

Another solution related to this requires a user to provide identifying information at the time of purchase. The merchant provides this information to a central processor, and the central processor provides activation codes to the customer. The customer then provides the activation code to the manufacturer or service provider before the device can be used.

BRIEF SUMMARY OF EMBODIMENTS

According to various embodiments of the disclosed technology,

A system for digital device security, includes: A digital security system, that includes: a receiver to receive product information about a plurality of products to be sold to a purchaser; a product identification generator circuit to create a unique product identifier for each of the plurality of products to be sold; an activation code generator circuit to create a unique activation code for each of the plurality of products to be sold; a scan code generator circuit to create a unique product scan code for each of the plurality of products to be manufactured, wherein the unique product scan code for each product comprises an identifier identifying the product as a product within a group of products to be manufactured and the unique product ID; a transmitter to provide a unique activation code and a unique product scan code to a manufacturer of the products for each of the plurality of products such that an activation hash string obtained by applying a hash function to a unique activation code for each of the plurality of products can be embedded in its respective product or otherwise stored; wherein the plurality of products are locked by a manufacturer using a locking circuit that requires entry of a correct activation code to unlock a product; further wherein a consumer upon purchasing a locked product receives the unique activation code corresponding to that locked product, enters the unique activation code, which is hashed to create a verification hash string; and wherein the verification hash string is compared to the activation hash string and if the verification hash string matches the activation hash string, the device is unlocked.

In various embodiments, the unique product scan code for a product to be sold comprises a combination of a UPC for that product and the unique product identifier created by the product identification generator circuit for that product.

The unique product scan code may be created by concatenating the UPC for that product with the unique product identifier created by the product identification generator circuit for that product. In other embodiments, the unique product scan code may be created by mathematically combining the UPC for that product with the unique product identifier created by the product identification generator circuit for that product. The unique product scan code may include, for example, a bar code, QR code or other optically recognizable or machine-readable code format. The unique product scan code may be affixed to a product to be manufactured, such that at the point of sale of a protected product, a merchant need only perform a single scan of the device to carry out the sale transaction for the protected product and identify the locked product to obtain the unique activation code corresponding to that locked product.

In various embodiments, the hash string may be generated by the digital security system and provided to the product manufacturer. In other embodiments, the hash string generated may be provided to the product manufacturer in lieu of the activation code. The hash string may also be generated by the product manufacturer for a product to be locked.

In yet another embodiment, method for providing digital security for electronic products, may include: generating a unique activation code, unique product identification code, and unique product scan code for each electronic product to be protected by a digital security mechanism and assigning the unique activation code, unique product identification code, and unique product scan code to its corresponding electronic product; generating an unlock code in the form of a hash string for each electronic product to be protected, wherein for a given electronic product that is to be protected, the hash string is generated from the unique activation code assigned to that electronic product; embedding the unlock code into the electronic product to be protected or storing the unlock code at a server, incorporating a digital security circuit into the electronic product to be protected, and locking the electronic product to be protected to create a locked electronic product; affixing the unique product scan codes to their corresponding electronic products; at the point of purchase of a locked electronic product being purchased by a purchaser, scanning unique product scan code of the locked electronic product being purchased to identify the unique activation code and providing to the purchaser the unique activation code assigned to the locked electronic product being purchased; and in response to the purchaser entering the unique activation code assigned to the purchased electronic product, generating a hash string from the entered unique activation code, comparing this generated hash string with the hash string embedded in the locked electronic product that was purchased to determine if they correspond to one another, and if the generated hash string corresponds to the hash string embedded in the locked electronic product, unlocking the electronic product.

The unique product scan code assigned to a product may include a combination of a UPC for that product and the unique product identifier assigned to that product. The unique product scan code may be created by concatenating the UPC for that product with the unique product identifier created by the product identification generator circuit for that product. In other embodiments, the unique product scan code may be created by mathematically combining the UPC for that product with the unique product identifier created by the product identification generator circuit for that product. The unique product scan code comprises a bar code, QR code or other optically recognizable or machine-readable code format.

In various embodiments, a unique product scan affixed to a product may include sufficient information such that at the point of sale of a protected product, a merchant need only perform a single scan of the device to carry out the sale transaction for the protected product and identify the locked product to obtain the unique activation code corresponding to that locked product.

The unlock code may be generated by the digital security system and provided to the product manufacturer. The unlock code generated by the digital security system may be provided to the product manufacturer in lieu of the activation code.

A process of generating the unlock code for a given electronic product to be protected may include hashing the unique activation code assigned to said given electronic product to be protected. The the unique activation code is a clear text alphanumeric string such as a series of numbers, letters, or other characters, or a combination of one or more of the foregoing.

The process of assigning the unique activation code, unique product identification code, and unique product scan code to an electronic product to be protected may include linking the unique activation code, unique product identification code, and unique product scan code with the corresponding electronic device to be protected in a database.

The process of providing to the purchaser the unique activation code assigned to the locked electronic product being purchased may include the merchant retrieving the unique activation code assigned to the locked electronic product from a security database and the merchant providing the retrieved unique activation code to the purchaser of the locked electronic product.

The process of providing to the purchaser the unique activation code assigned to the locked electronic product being purchased may include, the user logging into a website with information provided at the point of purchase to retrieve the unique activation code assigned to the locked electronic product from a security database.

The process of generating a hash string from the entered unique activation code may include unlock circuitry in the locked electronic product applying a hash function to the entered unique activation code.

The process of generating a hash string from the entered unique activation code comprises the locked electronic product providing the entered unique activation code to a security system via a communication network, the security system applying a hash function to the unique activation code to generate the hash string, and a security system returning the hash string to the locked electronic product. The generated hash string may be compared to the unlock code by the security system. The generated hash string may be compared to the unlock code by the locked electronic product.

The user may enter the unique activation code into the purchased electronic product via a GUI of the purchased electronic product. The process of generating a hash string from the entered unique activation code may include a digital security circuit of the purchased electronic product hashing the entered activation code to create an unlock code. The process of comparing the generated hash string with the hash string embedded in the locked electronic product may include the digital security circuit of the purchased electronic product comparing the unlock code with the embedded hash string to determine if they match.

The process may also include the purchased electronic product sending the entered activation code to a server and the process of generating a hash string from the entered unique activation code may include the server hashing the entered activation code to create an unlock code. The server may return the unlock code to the purchased electronic product and wherein comparing the generated hash string with the hash string embedded in the locked electronic product may include the digital security circuit of the purchased electronic product comparing the unlock code with the embedded hash string to determine if they match. The process of comparing the generated hash string with the hash string embedded in the locked electronic product may include the digital security circuit of the purchased electronic product comparing the unlock code with the embedded hash string to determine if they match. In other embodiments, the hash string need not be embedded in the product. For example, it may be stored in a device security database.

The purchaser may enter the unique activation code via a GUI on the device, via a web interface or other online access, or via a GUI on another device that is communicatively coupled to the device. The process may further include a server receiving the unique activation code from the purchaser and generating a hash string from the entered unique activation code may include the server hashing the entered activation code to create an unlock code.

The process may further include sending the unlock code to the locked electronic product and wherein comparing the generated hash string with the hash string embedded in the locked electronic product comprises the digital security circuit of the purchased electronic product comparing the unlock code with the embedded hash string to determine if they match.

In various embodiments, the purchased electronic product may update a server to reflect that the purchased electronic product has been sold and activated.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward devices and methods for providing digital security for electronic devices of all kinds. More particularly, some embodiments use a combination of a unique product identifier and unique activation code for each protected product to ensure that the protected device is locked and can only be unlocked and used by an authorized purchaser of the device.

Figure 1:
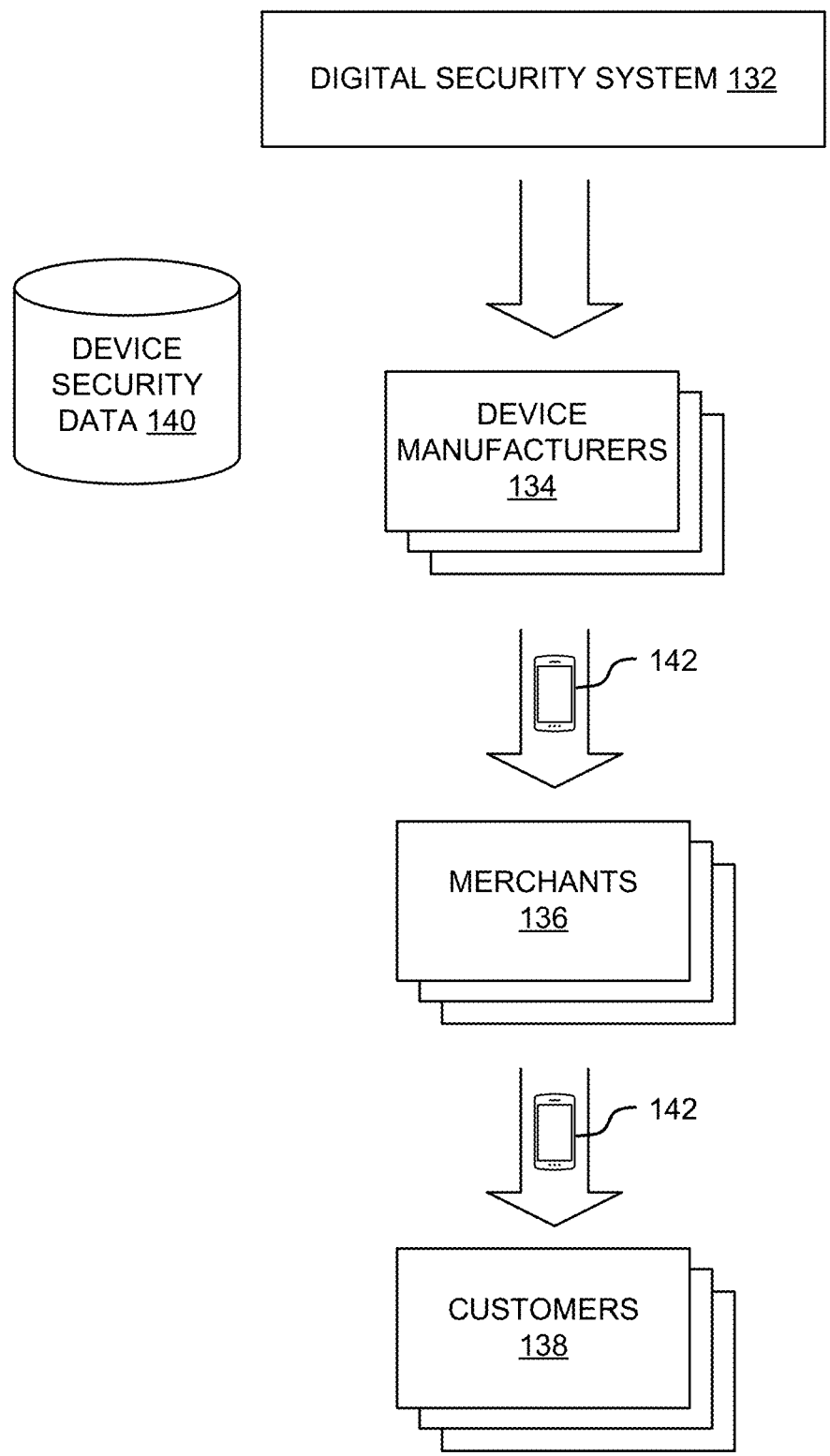
FIG. 1 is a diagram illustrating an example environment with which embodiments of the systems and methods described herein may be implemented.

FIG. 1 is a diagram illustrating an example environment with which embodiments of the systems and methods described herein may be implemented. This example illustrates a common distribution channel for electronic devices 142, which includes device manufacturers 134, device merchants 136, and customers 138. The example of FIG. 1 includes a digital security system 132 and an associated device security database 140 for storing device security data. Embodiments operating in this and other like environments are described below. However, in general terms, digital security system 132 includes circuitry to generate a unique product identification and random activation code for each device that is protected (i.e., a covered product). The digital security system may also create a unique product identification scan code (e.g., barcode, QR code, RFID tag, or other identification label) for each product. These unique identifiers and codes can be provided to the device manufacturers 134 to be included with the devices to be protected. The device manufacturers 134 may include a locking mechanism (e.g., an application or other locking circuitry) to lock the device electronically to prevent unauthorized use. The locked devices 142 can then be provided to merchants 136 for ultimate resale to customers 138.

The various embodiments disclosed herein are described in terms of the parties and the example depicted in FIG. 1. However, the applicability of the disclosed technology is not limited to this example. In the example illustrated in FIG. 1, locked devices 142 are illustrated as a smart phone. However, as one of ordinary skill will appreciate after reading this document, the devices that can be protected by the systems and methods described herein are not limited to smart phones or other like devices. Indeed, any of a number of different types of electronic devices may be protected using the technology disclosed in the various embodiments described herein. Likewise, the act applicability of the disclosed security techniques is not limited to merchants and end-user customers in the traditional sense. Instead, merchants 136 and customers 138 may be other parties who are taking part in a device transaction that would benefit from the locking and authorized unlocking techniques described herein. Nonetheless, to provide context and for clarity of description, the embodiments described in this where the document are described in terms of a direct-to-consumer seller as merchant 136 selling directly to an end-user purchaser as customer 138.

Figure 2:
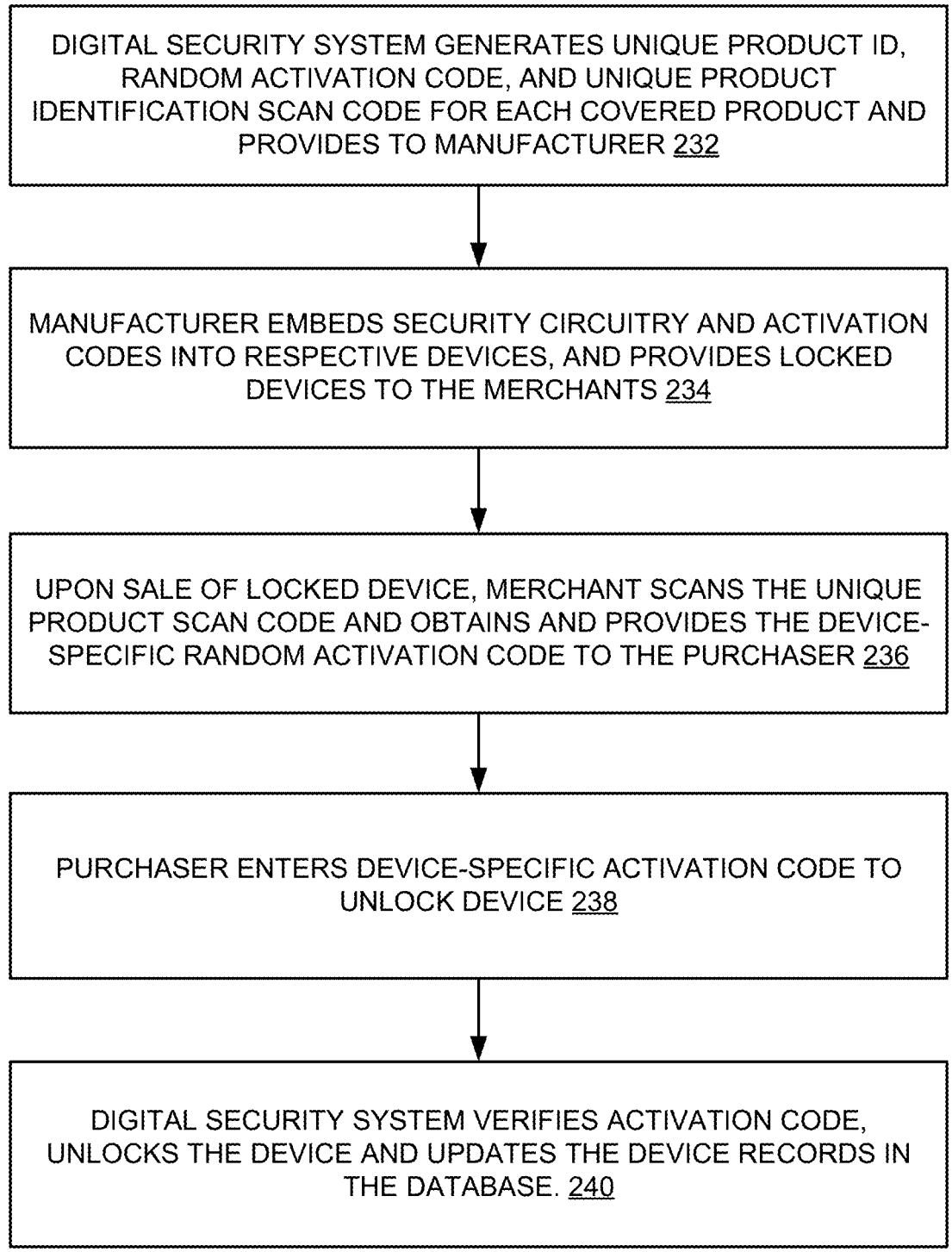
FIG. 2 is a diagram illustrating an example process for device security in accordance with one embodiment of the systems and methods described herein.

FIG. 2 is a diagram illustrating an example process for device security in accordance with one embodiment of the systems and methods described herein. With reference now to FIG. 2, at operation 232 the digital security system (e.g., digital security system 132) generates a unique product ID, a unique random activation code, and a unique product identification scan code for each device to be protected by the digital security measure. Because these security codes are unique to an individual device, they may each be identified in the database as corresponding to the devices with which each is assigned. The digital security system provides this information to device manufacturers (e.g., device manufacturers 134) to be used in manufacturing and preparing the devices for distribution. In some embodiments, the digital security system provides the activation codes as clear text activation codes. In other embodiments, the digital security system provides unlock codes (instead of or in addition to the activation codes) to the manufacturers in the form of a hash string.

At operation 234, the manufacturer embeds security circuitry into the devices to be protected, and loads the security codes onto the devices or the device server, or both. For example, in some embodiments the digital security system may provide the unlock codes to the manufacturers as a hash string created by applying a hash function to the activation codes. The manufacturer may then embed the resultant hash string in the device. The manufacturer may also embed a hashing algorithm inside the device and a hash string may be embedded in a device server (e.g., device security database 140). When the user keys in the activation code, the hashing algorithm is called to hash the activation code and validate the activation code (as described in more detail below). The manufacturer then distributes the locked devices to the merchant (e.g., merchants 136).

At operation 236, upon the sale of a locked device, the merchant scans the unique product scan code and obtains a device-specific random activation code corresponding to that device from the digital security system, and provides that activation code to the purchaser. The unique product scan code may contain product information such as conventional UPC information as well as the unique product ID generated by the digital security system. Accordingly, in some embodiments, scanning of the unique product scan code may be a single scan operation that captures important sales and product data regarding the product at the point of purchase. In other words, the merchant need not scan a UPC code and a unique product ID in 2 separate steps. With this sales and product data, the merchant retrieves and returns the activation code to the purchaser.

When the purchaser is ready to activate the locked device, the purchaser enters the provided device-specific activation code to unlock the device. This is illustrated at operation 238. The purchaser enters the activation code into the device which may be in clear text. The validation process may be done either within the device itself (e.g., in firmware or other device circuitry) offline with no internet access required or online using a device server. In either process, the hashing algorithm is called to hash the cleartext activation code to create an activation hash string and validate the result against the original hash string stored in the device or stored at the device server. This is illustrated at operation 238.

Upon receipt of the activation code, the device circuitry or device server verifies the code, unlocks the device if the hash of the inputted activation code matches the unlock code (e.g., original hash string embedded in device or stored in server) and updates the device records in the digital security system database. This is shown at operation 240.

Figure 3:
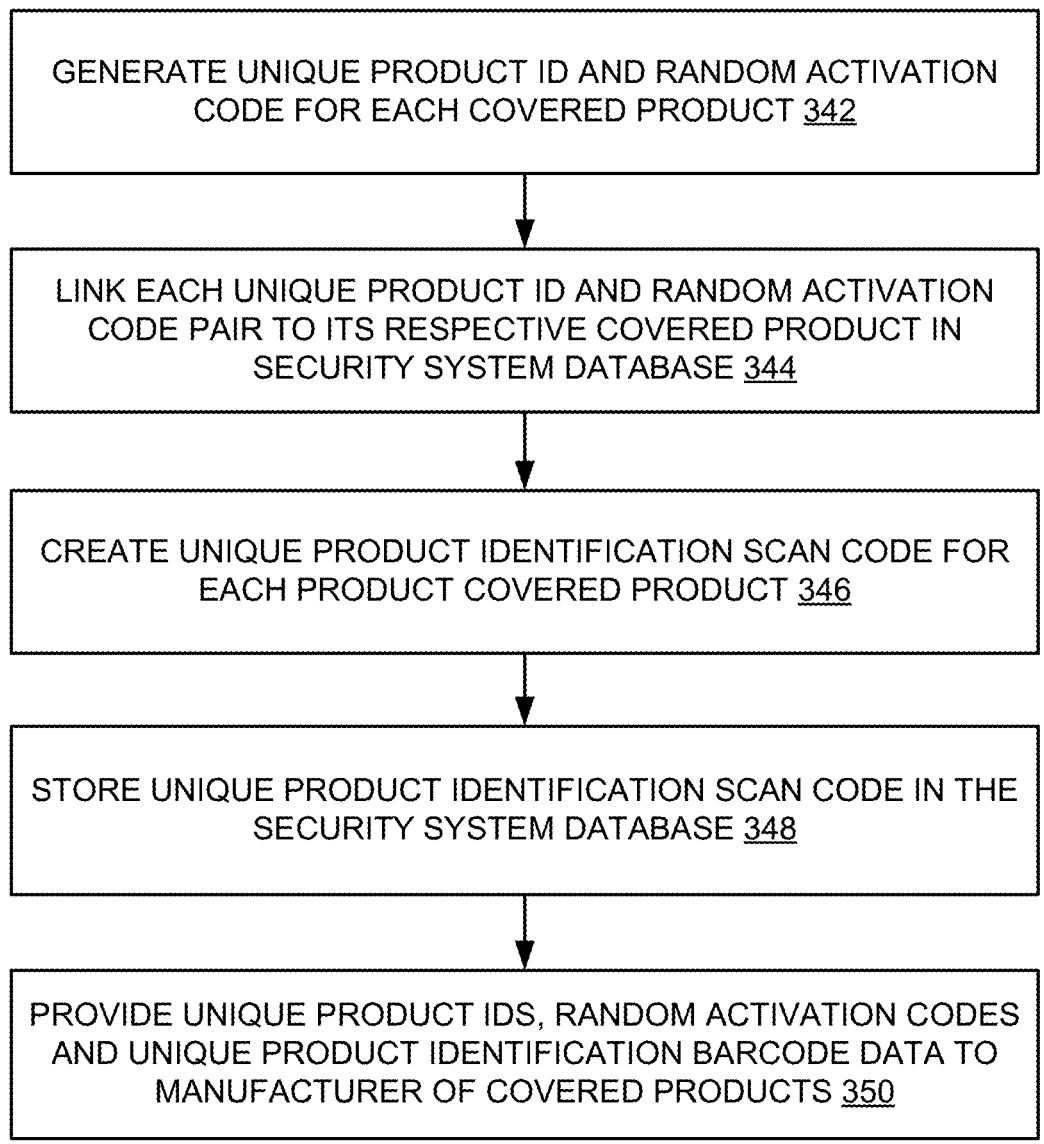
FIG. 3 illustrates an example process for a digital security system in accordance with one embodiment of the systems and methods described herein.

Having thus described a high level overview of systems and methods for device security, more specific example embodiments are now described with reference to an example digital security system (e.g. digital security system 132), device manufacturers (e.g., device manufacturers 134), merchants (e.g., merchants 136) and customers (e.g., customers 138). FIG. 3 illustrates an example process for a digital security system in accordance with one embodiment of the systems and methods described herein.

With reference now to FIG. 3, at operation 342 the digital security system generates a unique product identifier and a unique random activation code for each device to be locked in accordance with the operation of the security system. In some embodiments, the manufacturer provides device information such as, for example, model number, model name, product serial number and a UPC (Universal Product Code) for each product the manufacturer wants to be protected by the system. The unique product identifier uniquely identifies each individual product to be protected. In some embodiments, the unique product identifier can be analogized to a unique digital fingerprint for each device. Accordingly, through the use of the unique product identifier each product can now be uniquely identified. For example, product identification is not limited to a class of products (e.g., by model number), but each product within that class (or even across multiple classes) and have a unique identification number. Although in some embodiments the unique product identifier is unique for each product to be protected, in other embodiments, the unique product identifier may be reused, for example, over time, or for different product classes or product types.

The activation code may also be unique for each protected product, or for each product in a class of products. In some embodiments, the activation code may be a random activation code that is generated using a random-string generation process. In some embodiments, the random-string generation process can use the system-created unique product identifier, a product serial number, or other unique identifying information to generate the random activation code. In other embodiments, the activation code is not generated using a random-string generation process, but may be chosen specifically for each product, or as a non-random mathematical process. In various embodiments, the unique product identifier and activation codes may be a numeric, alphabet, alphanumeric, national characters, special characters, or other like character string or strings, or any combination of any of the foregoing.

At operation 344, the digital security system links each unique product ID and random activation code to its respective covered product in a security system database (e.g., device security database 140). As such, the digital security system can retrieve, when needed, the unique product identifier, the random activation code, or both corresponding to (e.g., assigned to, created for, etc.) a given product upon request.

At operation 346, the digital security system creates a unique product identification scan code for each product to be protected. The scan code can be a combination of the UPC for the product and the unique product identifier. Accordingly, in various embodiments, the scan code can be used to not only identify a product type or model (e.g., the conventional UPC identification), but also to identify each product uniquely. The scan code can be implemented as, for example, a barcode, QR code, RFID tag, or other like scannable code. Preferably, the scan code is a machine readable code that can uniquely identify the product upon querying by optical, electrical, RF, or other electromagnetic means. The unique product identification scan code can be created by concatenating the UPC of the product with the unique product identifier for that product. This can be a simple concatenation (e.g., one after the other), and interleaving of symbols, or other concatenation. In further embodiments, unique product identification scan code can be created by combining the product UPC with the unique product identifier for that product using a mathematical relationship.

At operation 348 the scan code (or a numeric, Alpha, alphanumeric, etc. representation of the scan code) may also be stored in a security system database and linked to its respective corresponding product. The scan code in some embodiments includes product and sales data of the device which can be captured or retrieved at the point of sale using one single-scan operation.

At operation 350, the generated product information can be provided to the manufacturer of the devices to be protected. For example, the digital security system can provide to the manufacturer the unique product identification, random activation code and unique product scan code for each product to be protected, along with an identification of each product to which these unique codes correspond. Accordingly, as a result of the foregoing or other like operations, the digital security system has created security data that includes a unique product ID, a unique activation code and a unique product scan code for each product to be protected, and has linked these items in a database so that they can later be used for authentication and device unlocking. Examples of device authentication and unlocking steps are described in further detail below.

Figure 4:
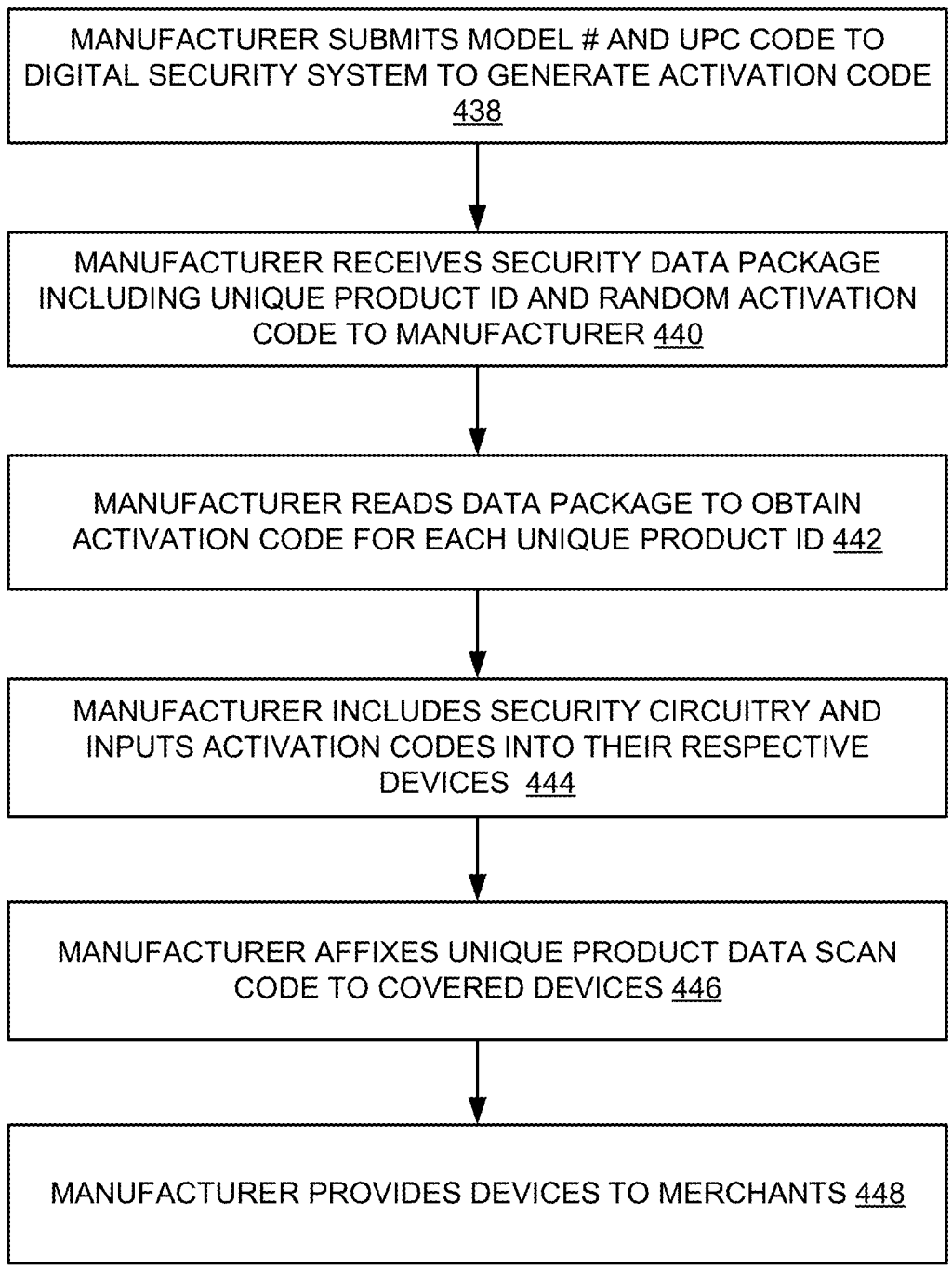
FIG. 4 is a diagram illustrating an example process used by a manufacturer for device security in accordance with one embodiment of the systems and methods described herein.

FIG. 4 is a diagram illustrating an example process used by a manufacturer for device security in accordance with one embodiment of the systems and methods described herein. Referring now to FIG. 4, in this example at operation 438 the manufacturer of a group of products to be secured (e.g., one of the device manufacturers 134) submits product information about the products it wishes to protect to the digital security system. This product information can include, for example, model # and a UPC code. As described above, the digital security system may use the model number or UPC code to generate a unique scan code for each product and a unique activation code that corresponds with the unique scan code such that the activation code can be used to unlock the device that belongs to the unique scan code.

At operation 440, the manufacturer receives the security data package from the digital security system. As described above, this can include the unique product identification scan code its corresponding unique activation code for each individual product to be protected. In various embodiments, the digital security system can also provide the unique product identifier to the manufacturer as well. In some embodiments, the data package can be transmitted to the manufacturer via the digital security system (e.g., through a secure communication link) emailed to the manufacturer, communicated via telephone, or otherwise transmitted to the manufacturer. In other embodiments, the manufacturer can be provided access to the device security database (e.g., device security database 140) so that the manufacturer can access the data package for its products. One way to do this is by web access, although other access mechanisms may be provided. The data package can be password-protected or otherwise protected from unauthorized access via appropriate security measures. At operation 442, the manufacturer reads the data package. In some embodiments, the data package can be a zipped or otherwise coded file such as, for example, a zipped CSV file, that includes activation codes and unique product ID scan codes for group of devices to be manufactured by the manufacturer.

At operation 444, the manufacturer manufactures the product and includes the appropriate security circuitry with the product. In some applications, for example, security circuitry can include a FPGA, ASIC, firmware or other circuitry to lock the device pending receipt of an appropriate activation code. For each device, the manufacturer may parse the data package file to retrieve the appropriate product identification scan code and activation code for each product being manufactured. The manufacturer can ensure that the product is locked using the lock circuitry. In some embodiments, the activation code is provided to the manufacturer by the digital security system as a hash string created by hashing the activation code according to a hash function. In other embodiments, the activation codes are provided to the manufacturer by the digital security system and the manufacturer performs a hash function on the activation code to create a hash string. Accordingly the activation code can stored as a hash value in the device such as, for example, in firmware or in memory in the security circuitry. The hash value can be hard coded into the lock circuitry, burned into memory (e.g., ROM) or otherwise stored on the device. It can also be stored in a device server database for later recall by authorized users (e.g., by the manufacturer). An example hash function is described below.

The manufacturer affixes the appropriate unique product identification scan code to each product to be protected. In some embodiments, the scan codes can be etched directly onto the product packaging or otherwise affixed so as to prevent tampering with the label. This is illustrated at operation 446. At operation 448, the manufacturer provides the locked devices to merchants (e.g., merchants 136).

Figure 5:
FIG. 5 illustrates an example of unique product scan codes in accordance with one embodiment of the systems and methods described herein.
Figure 5:
Figure 5:
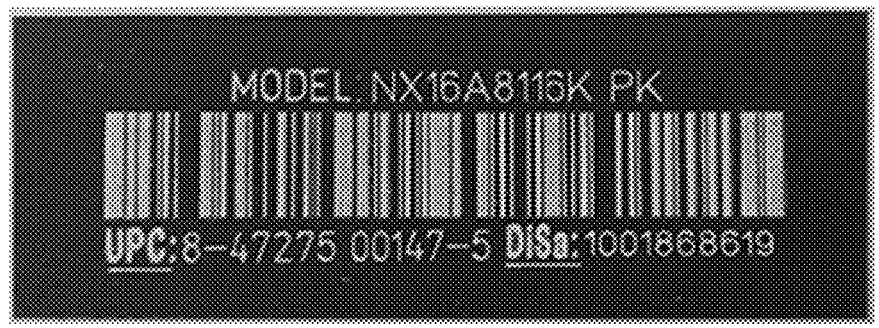

FIG. 5 illustrates an example of unique product scan codes in accordance with one embodiment of the systems and methods described herein. This figure includes 3 example scan codes 510, 512, 514. In this example, each scan code is a combination of a UPC code for the product and the unique product ID (labeled DiSa in the examples) created for the particular product. In this example, the unique scan code is a concatenation of the UPC with the unique product identification determined by the digital security system. In other embodiments, other techniques can be used to arrive at a unique code to be embodied in the unique product scan code.

Figure 6:
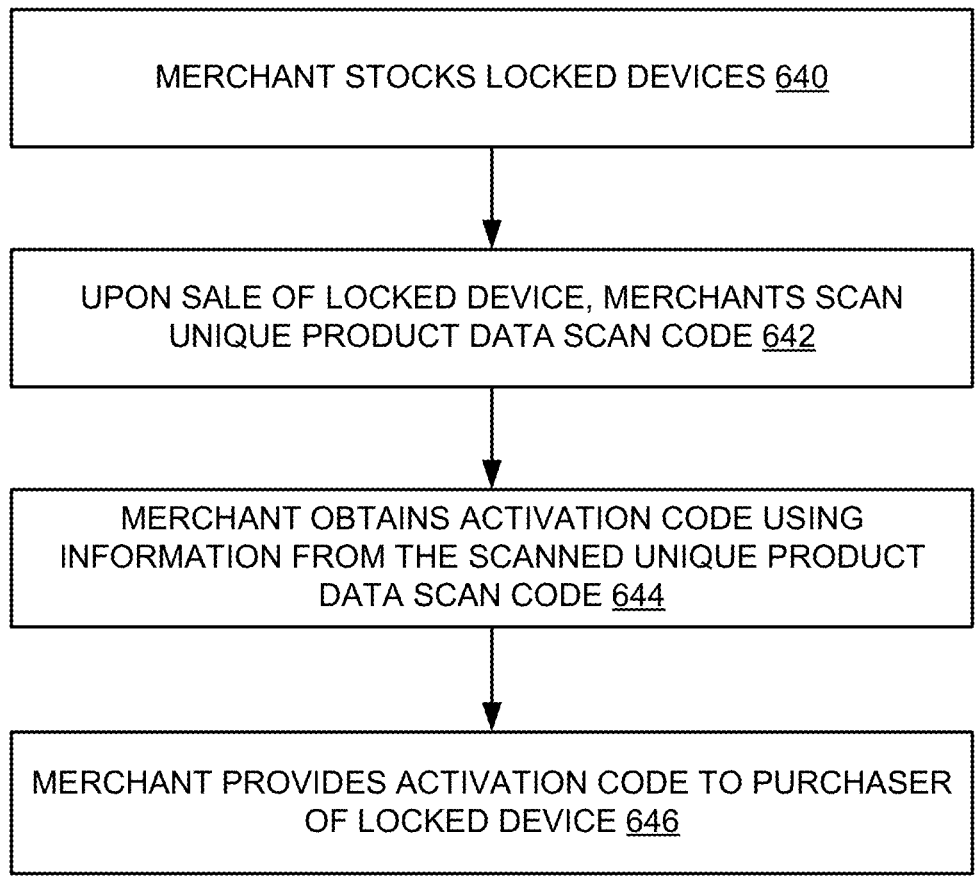
FIG. 6 is a diagram illustrating an example process performed by a merchant in accordance with one embodiment of the systems and methods described herein.

FIG. 6 is a diagram illustrating an example process performed by a merchant in accordance with one embodiment of the systems and methods described herein. With reference to FIG. 6, at operation 640, the merchant receives locked devices from the manufacturer, the devices can be received directly from the manufacturer or indirectly such as, for example, through a variety of sourcing or distribution channels. The merchant may stock the protected devices and make them available for retail sale to customers (e.g., customers 138).

At operation 642, when the merchant sells a locked device to a customer, the merchant may scan the unique product scan code. Because in various embodiments the unique product scan code includes both the UPC and the unique product identifier, applications may be implemented in which only a single scan is required to both check-out the device at the POS system (i.e., scan the UPC barcode for the purchase transaction) and to obtain the appropriate activation codes for the customer based on the unique product identification code that may also be obtained by scanning the scan code. In other words, the unique product scan code may include sufficient information to allow the product-sale transaction to take place, and retrieve the activation codes with a single scan.

Providing an implementation with a combined unique product scan code that allows a single scan operation to be performed, the cashier (or other merchant personnel) can capture both UPC (or like) product data and the unique product identifier (for digital security purposes) without having to search for and scan multiple barcode labels. Thus, a single and efficient scan operation can allow the retail system to capture product data to enable the sale transaction to take place, update inventory, etc., and allow the system to obtain the correct activation code because the unique product ID uniquely identifies the specific device being sold. In various applications, the single scan can also be used to update inventory, perform sales analytics, and enable the functionality of the device security as described herein. This can prevent the theft of electronic devices and return fraud.

Accordingly, at operation 644, the merchant obtains the activation code using information obtained by scanning the unique product data scan code. In one embodiment, the merchant may access the security database to obtain the activation code. This can be done, for example, by the merchant accessing the digital security system database or accessing a database of the manufacturer that includes the same information. In either case, the database access may be provided as a secure access with password or other like access protections as well as data encryption.

At operation 646, the merchant provides the obtained activation code for that device to the purchaser. For example, in some embodiments, the activation code may be printed on the customer's receipt, emailed to the customer, texted to the customer, or otherwise provided to the customer. In some applications, the process may be automatic such that the POS recognizes the unique product scan code retrieves the activation code and provides it to the user (e.g. through one or more of the aforementioned methods).

Figure 7:
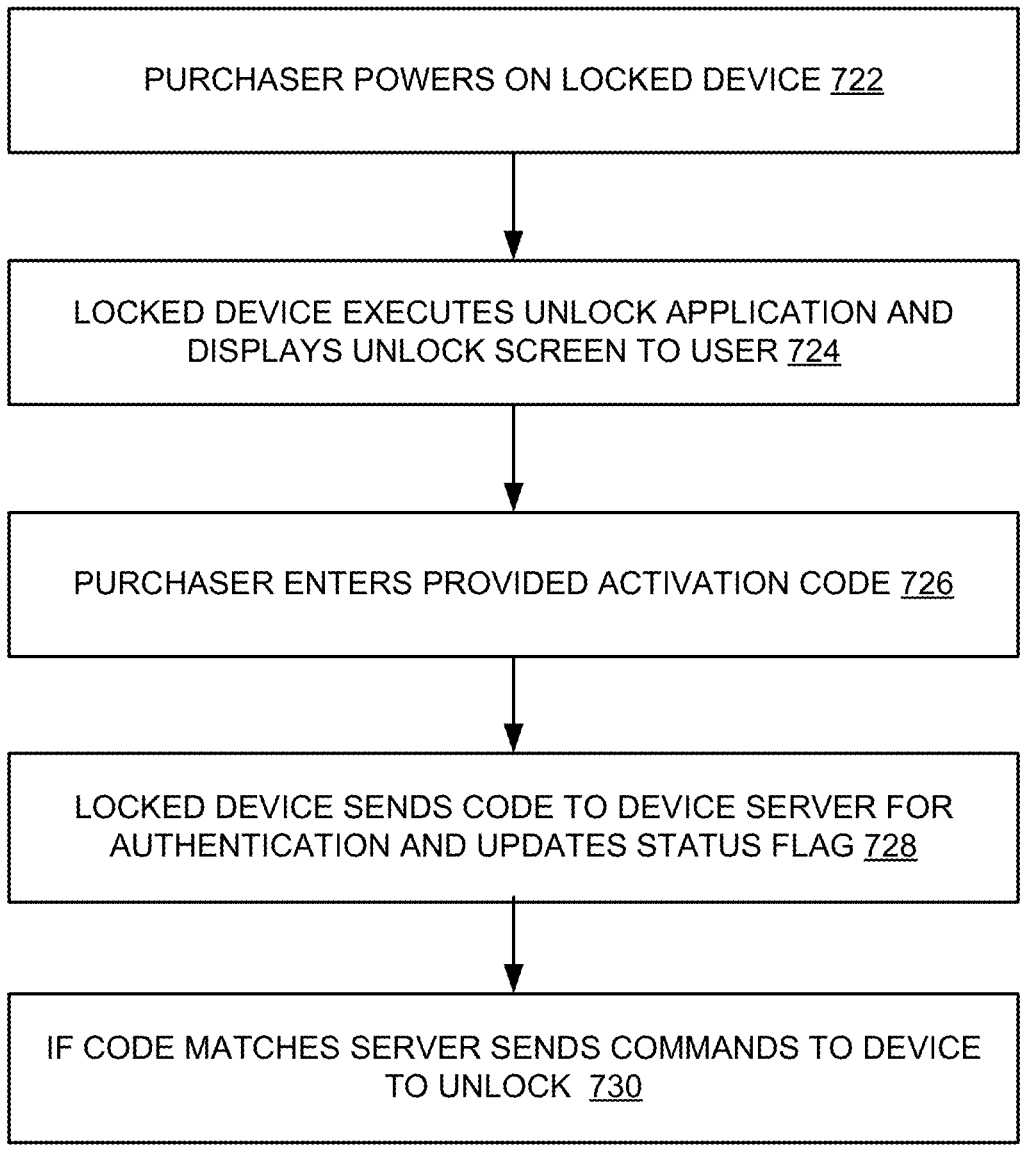
FIG. 7 is a diagram illustrating an example process performed by a purchaser of a locked device in accordance with one embodiment of the systems and methods described herein.

FIG. 7 is a diagram illustrating an example process performed by a purchaser of a locked device in accordance with one embodiment of the systems and methods described herein. Referring now to FIG. 7, at operation 720 to the purchaser powers on the locked device. At operation 724, locked device initiates the unlock process. For example, in one embodiment, the device initiates the lock circuit to begin unlock operations. Where the lock circuit includes an unlock application, the application is executed. In devices equipped with a display screen (e.g., GUI or other display), one or more unlock displays may be displayed to the user via the display screen or other display apparatus so that the user can interact with the device (e.g., input and activation code) for the unlock operation.

Figure 8:
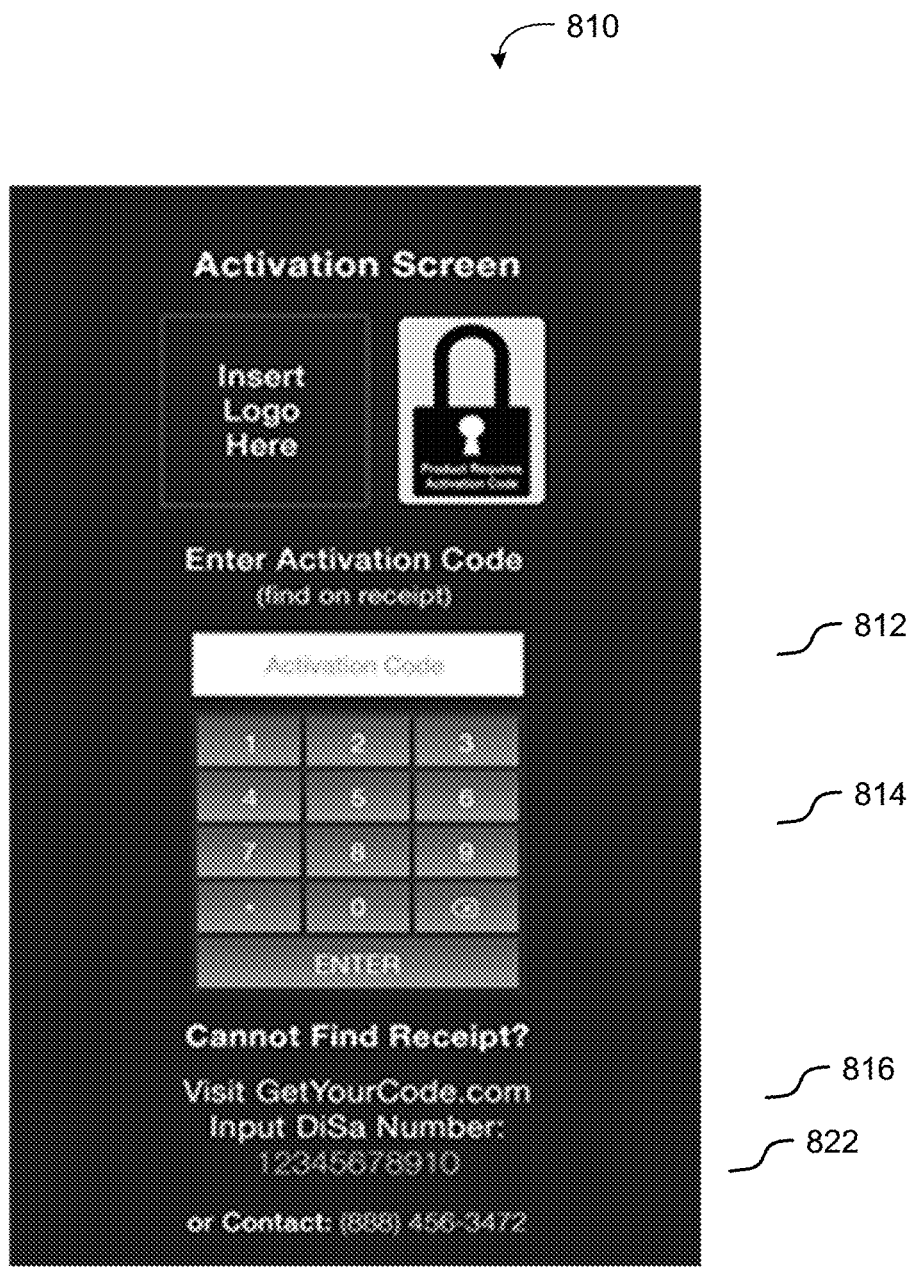
FIG. 8 is a diagram illustrating an example activation screen that may be displayed to a user as part of an unlock operation in accordance with one embodiment of the systems and methods described herein.

FIG. 8 is a diagram illustrating an example activation screen that may be displayed to a user as part of an unlock operation in accordance with one embodiment of the systems and methods described herein. In this example, activation screen 810 includes a data entry field 812 in which to enter the activation code and a keypad 814 to allow the user to enter the code. In this example, keypad is a numeric keypad for the entry of a purely numeric code. In other examples, keypad may be alphanumeric or include other characters such that the activation code is not a purely numeric code. This example also includes contact information 816 to provide information to the user to obtain the appropriate device activation code through other methods in the event that she or he lost her or his receipt. This example includes the unique product identification number 822 to assist the user in obtaining the activation code. In various embodiments, if the user visits a website or uses the telephone or email contact, the user may be required to provide proof of purchase to obtain the activation code.

Returning now to FIG. 7, at operation 726 purchaser enters the activation code. For example, the activation code can be entered into the device using the keypad 814 on activation screen 810. In embodiments that do not include a user display, other techniques for device unlocking may be provided. For example, various devices may be equipped with Bluetooth, Wi-Fi, or other means of access through which the purchaser may enter his or her activation code. As a further example, the user may sync his or her smart phone, tablet, or other smart device to the locked device and the unlock screen can be displayed on the synced smart device. As yet another example, the locked device may be connectable to the Internet (e.g., Wi-Fi, ethernet, etc.) and the purchaser may be able to log on to a website on the Internet to provide her or his activation code.

At operation 728, the locked device provides the activation code to the device's unlock circuitry (e.g. digital security circuit 1016 at FIG. 10) or sends it to the digital security system for authentication. At operation 730, the device's lock circuit or the digital security system checks the code for a match. This can be done, for example, by applying the same hash function to the activation code and verifying that the resultant hash string matches the stored hash string (in the device or at the device server). If the activation code is verified, the device can be unlocked. Where the device's unlock circuitry is used to verify the activation code, the unlock circuitry can now unlock the device and enable access by the user. If verification was performed by the digital security system, the digital security system may send commands to the device to unlock the device. The digital security system may update the device status as "sold" to identify that the device has been sold and unlocked.

As noted above, in one embodiment, a hash function or other like technique can be used to create a locking code for the device. In one embodiment, a B-crypt hash value is created by encoding the activation code into a 184 bit fingerprint using the B-crypt algorithm. The B-crypt hash function does not perform encryption, but it hash is based on the blowfish cipher which provides the benefit of being brute-force resistant. The same hash function can be used by the device's unlock circuitry or the digital security system to verify the authentication code. When the activation code is received by the device's lock circuit, for example, the lock circuit performs the hash function and checks the resultant hash string against that stored in the device for a match. If there is a match, the lock circuitry unlocks the device, and may also display a message to the user regarding the unlocked status of the device. In embodiments where the activation code is sent to the digital security system for verification, the digital security system performs the hash function and checks the result against the originally stored hash string to see if they match. If there is a match, the digital security system sends a command set to the device to unlock the device. It can update the database to mark the device as sold.

Figure 9:
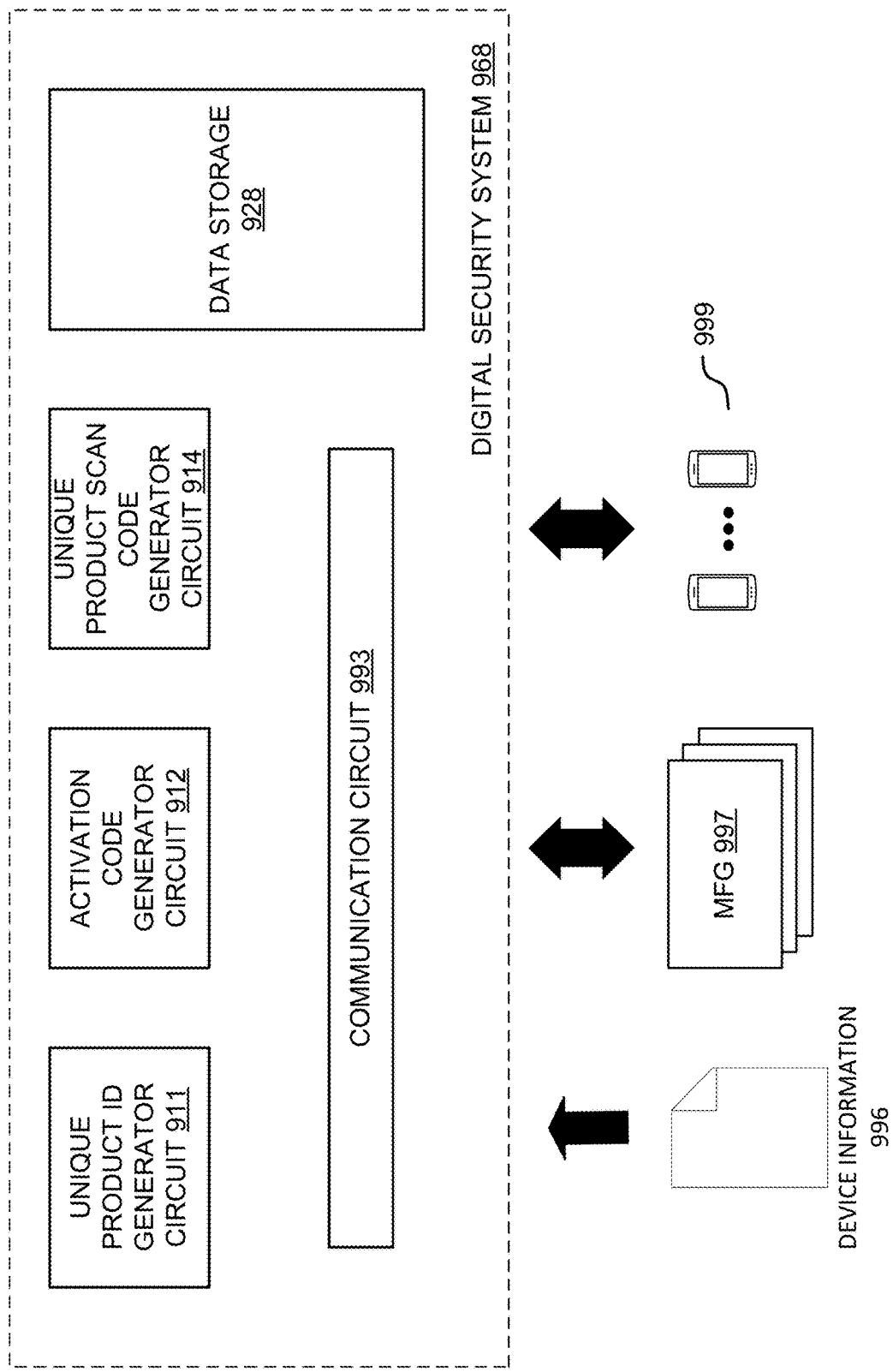
FIG. 9 is a diagram illustrating an example of a digital security system in accordance with one embodiment of the systems and methods described herein.

FIG. 9 is a diagram illustrating an example of a digital security system in accordance with one embodiment of the systems and methods described herein. This example digital security system 968 includes a unique product ID generator circuit 911, and activation code generator circuit 912, unique product scan code generator circuit 914, data storage 928 and communication circuit 993. The various circuits may be implemented using ASICs, FPGAs, processors, firmware, software or other instrumentalities.

In operation, the digital security system receives information from device manufacturers 997 (e.g., manufacturers 134), which can include, for example, device information, UPC information for devices, and so on. Digital security system 968 may receive device information 996 from other sources as well. For authentication purposes digital security system 968 may receive information such as, for example, authentication codes, from devices 999. Unique product identification generator circuit 911 uses the received device information to create unique product ID for each device on the manufacturers list. In some embodiments, generator circuit 911 sequentially assigns a string of numbers to each product. In another embodiment, generator circuit 911 puts together a coded string of numbers based on the product information. In yet another embodiment, a random but unique number is assigned. Activation code generator circuit 912 creates a unique activation code for each device. In some embodiments, this is created using a random number generator that generates a random number unique to each device. In some embodiments, the activation code is a string of numbers. In other embodiments, the activation code is a string of alpha, alphanumeric, numeric, special, or other characters, or a combination of the foregoing. Unique product scan code generator circuit 914 creates the unique product scan code for each product. As described above, this can include a code that combines UPC information with the unique product ID.

Data storage 928 can be used to store the unique product IDs, activation codes, and product scan codes for each product. These created codes can be linked to their respective products in data storage 928. Communication circuit 993 can include wireless or wired communication interfaces, including wired or wireless transmitters and receivers, to receive information from and transmit information to third parties such as, for example, manufacturers, merchants, customers, and so on. For example, communication circuit 993 can include a web-based interface for communications.

Figure 10:
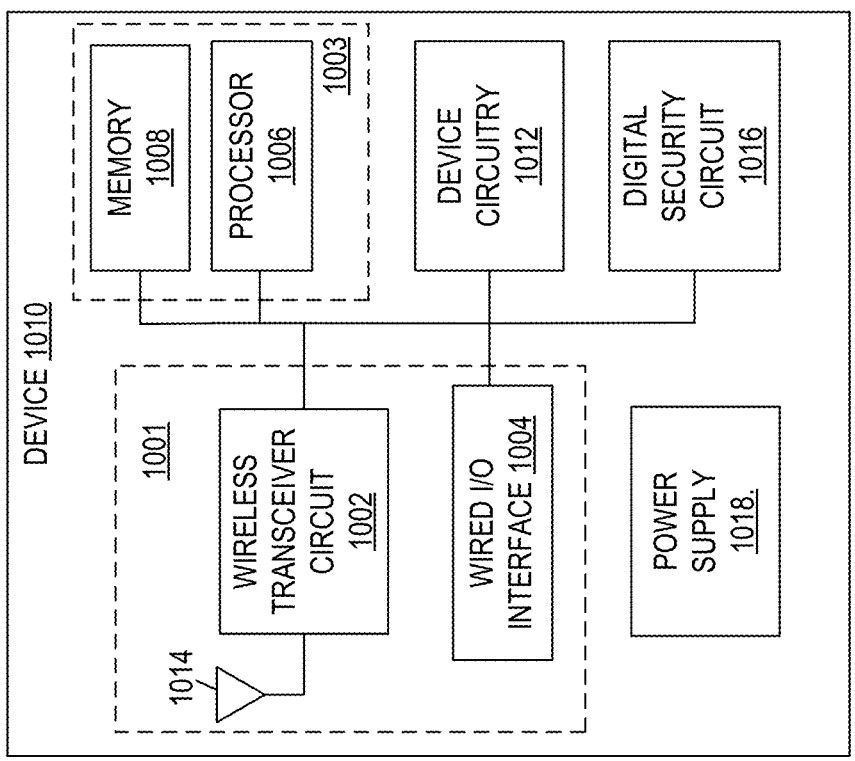
FIG. 10 is a diagram illustrating an example of a device that can be protected using the systems and methods disclosed herein.

FIG. 10 is a diagram illustrating an example of a device that can be protected using the systems and methods disclosed herein. This example device 1010 is an electronic device that includes device circuitry 1012 to perform device functions. For example, in the case of a digital camera, device circuitry 1012 may control camera operations, image capture, processing and storage, and so on. In some applications, this may be done in conjunction with processing circuit 1003. In other applications, device circuitry 1012 may likewise perform functions to control the operations of that device. This example also includes a processing circuit 1003 that includes processor 1006 and memory 1008, and a communication circuit 1001 that includes a wireless transceiver circuit 1002, a wired communication interface 1004 and an antenna 1014.

Digital security circuit 1016 can be included by the device manufacturer to perform the locking and unlocking functions in accordance with systems and methods described herein. Digital security circuit 1016 can include circuits to lock the device, present an unlock screen to the customer and manage the verification process through communication circuit 1001. As noted above, in some embodiments, digital security circuit 1016 presents an unlock screen to the user via a GUI or other display on device 1010 (not illustrated in this example). In other embodiments, digital security circuit 1016 may coordinate the unlocking operation with the customer via communications interface 1001. An example of this is described above in which the customer interfaces with device 1010 via her or his smart phone, tablet, or other instrument. Another example of this is described above in which the customer interfaces with device 1010 via a web interface.

Processing circuit 1003, which includes processor 1006 and memory 1008 can be used to support digital security circuit 1016 device circuitry 1012 communications circuit 1001 and other device functions. Power supply 1018 can be included to provide power to the device circuits. Power supply 1018 can include, for example, a battery or other chemical energy storage device, capacitive storage units, renewable power sources (e.g. photovoltaic cells), and so on.

Figure 11:
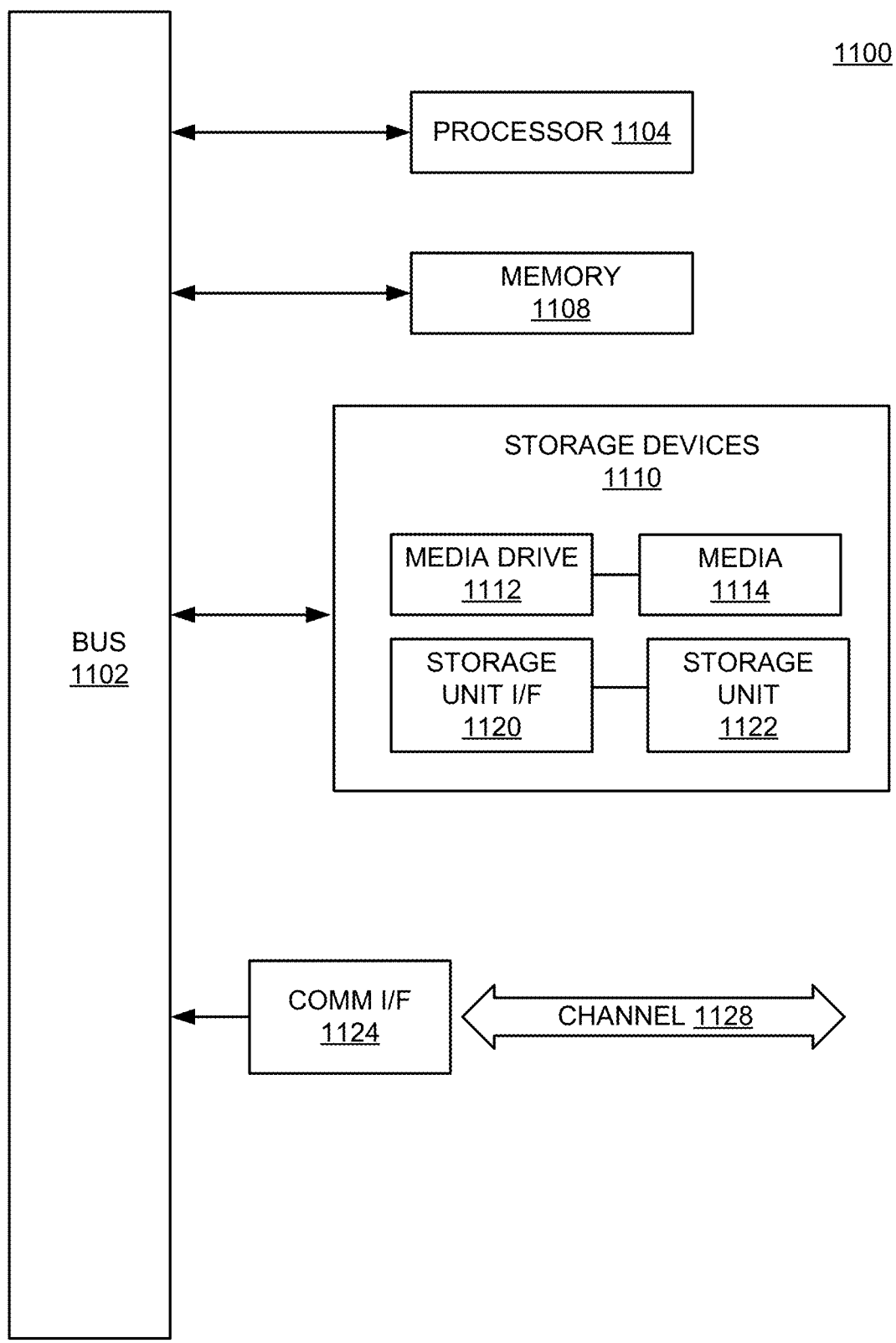
FIG. 11 illustrates an example computing module that may be used in implementing various features of embodiments of the disclosed technology.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 11. Various embodiments are described in terms of this example-computing system 1100. After reading this description, it will become apparent to a person skilled in the relevant art how to implement the technology using other computing systems or architectures.

Referring now to FIG. 11, computing system 1100 may represent, for example, computing or processing capabilities found within desktop, laptop and notebook computers; hand-held computing devices (smart phones, cell phones, palmtops, tablets, etc.); mainframes, supercomputers, workstations or servers; or any other type of special-purpose or general-purpose computing devices as may be desirable or appropriate for a given application or environment. Computing system 1100 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 1100 might include, for example, one or more processors, controllers, control modules, or other processing devices, such as a processor 1104. Processor 1104 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 1104 is connected to a bus 1102, although any communication medium can be used to facilitate interaction with other components of computing system 1100 or to communicate externally.

Computing system 1100 might also include one or more memory modules, simply referred to herein as main memory 1108. For example, in some embodiments random access memory (RAM) or other dynamic memory, might be used for storing information and instructions to be executed by processor 1104. Main memory 1108 might also be used for storing temporary variables or other intermediate information during execution of instructions to be executed by processor 1104. Computing system 1100 might likewise include a read only memory ("ROM") or other static storage device coupled to bus 1102 for storing static information and instructions for processor 1104.

The computing system 1100 might also include one or more various forms of information storage mechanism 1110, which might include, for example, a media drive 1112 and a storage unit interface 1120. The media drive 1112 might include a drive or other mechanism to support fixed or removable storage media 1114. For example, a hard disk drive, a floppy disk drive, a magnetic tape drive, an optical disk drive, a CD or DVD drive (R or RW), a flash drive, or other removable or fixed media drive might be provided. Accordingly, storage media 1114 might include, for example, a hard disk, a floppy disk, magnetic tape, cartridge, optical disk, a CD or DVD, or other fixed or removable medium that is read by, written to or accessed by media drive 1112. As these examples illustrate, the storage media 1114 can include a computer usable storage medium having stored therein computer software or data.

In alternative embodiments, information storage mechanism 1110 might include other similar instrumentalities for allowing computer programs or other instructions or data to be loaded into computing system 1100. Such instrumentalities might include, for example, a fixed or removable storage unit 1122 and an interface 1120. Examples of such storage units 1122 and interfaces 1120 can include a program cartridge and cartridge interface, a removable memory (for example, a flash memory or other removable memory module) and memory slot, a flash drive and associated slot (for example, a USB drive), a PCMCIA slot and card, and other fixed or removable storage units 1122 and interfaces 1120 that allow software and data to be transferred from the storage unit 1122 to computing system 1100.

Computing system 1100 might also include a communications interface 1124. Communications interface 1124 might be used to allow software and data to be transferred between computing system 1100 and external devices. Examples of communications interface 1124 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 1124 might typically be carried on signals, which can be electronic, electromagnetic (which includes optical) or other signals capable of being exchanged by a given communications interface 1124. These signals might be provided to communications interface 1124 via a channel 1128. This channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1108, storage unit 1120, media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 1100 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for digital device security, comprising:
   a receiver to receive product information about a plurality of products to be sold to a purchaser;
   a product identification generator circuit to create a unique product identification code for each of the plurality of products to be sold;
   an activation code generator circuit to create a unique activation code for each of the plurality of products to be sold;
   a scan code generator circuit to create a unique product scan code for each of the plurality of products to be manufactured, wherein the unique product scan code for each product comprises an identifier identifying the product as a product within a group of products to be manufactured and the unique product identification code; and
   a transmitter to provide the unique activation code and the unique product scan code to a manufacturer of the products for each of the plurality of products such that an activation hash string obtained by applying a hash function to the unique activation code for each of the plurality of products can be embedded in its respective product;
   wherein the plurality of products are locked by the manufacturer using a locking circuit that requires entry of a correct activation code to unlock each product;
   further wherein a consumer upon purchasing a locked product receives the unique activation code corresponding to the locked product, enters the unique activation code, which is hashed by a hash function embedded in the locked product to create a verification hash string; and
   wherein the verification hash string is compared to the activation hash string and if the verification hash string matches the activation hash string, the device is unlocked.

2. The system for digital device security of claim 1, wherein the unique product scan code for the locked product of the plurality of products comprises a combination of a UPC for that product and the identifier created by the product identification generator circuit for that product.

3. The system for digital device security of claim 2, wherein the unique product scan code is created by concatenating the UPC for that product with the unique product identifier created by the product identification generator circuit for that product.

4. The system for digital device security of claim 2, wherein the unique product scan code is created by mathematically combining the UPC for that product with the unique product identifier created by the product identification generator circuit for that product.

5. The system for digital device security of claim 2, wherein the unique product scan code comprises a bar code, QR code or other optically recognizable code format.

6. The system for digital device security of claim 1, wherein the unique product scan code is affixed to the locked product within the group of products to be manufactured, such that at a point of sale, a merchant need only perform a single scan of the device to carry out a sale transaction for the protected product and identify the locked product to obtain the unique activation code corresponding to the locked product.

7. The system for digital device security of claim 1, wherein the hash string is generated by the system and provided to the product manufacturer.

8. The system for digital device security of claim 7, wherein the hash string generated is provided to the product manufacturer in lieu of the activation code.

9. The system for digital device security of claim 1, wherein the hash string is generated by the product manufacturer for the locked product to be locked.

10. A method for providing digital security for electronic products, comprising:
    generating, by a digital security system, a unique activation code, a unique product identification code, and a unique product scan code for each electronic product to be protected by a digital security mechanism;
    assigning the unique activation code, the unique product identification code, and the unique product scan code to its corresponding electronic product;
    generating an unlock code in the form of a hash string for each electronic product to be protected, wherein for a given electronic product that is to be protected, the hash string is generated from the unique activation code assigned to that electronic product;
    storing the unlock code for the electronic product to be protected, incorporating a digital security circuit into the given electronic product to be protected, embedding a hashing algorithm corresponding to the hash string with the given electronic product, and locking the electronic product to be protected to create a locked electronic product;
    affixing the unique product scan codes to their corresponding electronic products;
    at the point of purchase of a locked electronic product being purchased by a purchaser, a merchant is enabled to scan the unique product scan code of the locked electronic product being purchased to identify the unique activation code and providing to the purchaser the unique activation code assigned to the locked electronic product being purchased; and
    wherein the device is enabled to receive the unique activation code assigned to the purchased electronic product, generate a hash string from the entered unique activation code using the embedded hashing algorithm, compare this generated hash string with the hash string embedded in the locked electronic product that was purchased to determine if they correspond to one another, and if the generated hash string corresponds to the hash string embedded in the locked electronic product, unlock the electronic product.

11. The method of claim 10, wherein the unique product scan code assigned to the locked electronic product of the plurality of products comprises a combination of a UPC for the locked electronic product and the unique product identifier assigned to the locked electronic product.

12. The method of claim 11, wherein the unique product scan code is created by concatenating the UPC for the locked electronic product with the unique product identifier created by the product identification generator circuit for the locked electronic product.

13. The method of claim 11, wherein the unique product scan code is created by mathematically combining the UPC for the locked electronic product with the unique product identifier created by the product identification generator circuit for the locked electronic product.

14. The method of claim 11, wherein the unique product scan code comprises a bar code, QR code or other optically recognizable code format.

15. The method of claim 10, wherein the unique product scan code affixed to the locked electronic product includes sufficient information such that at a point of sale, a merchant need only perform a single scan of the device to carry out a sale transaction for the locked electronic product and identify the locked electronic product to obtain the unique activation code corresponding to the locked electronic product.

16. The method of claim 10, wherein the unlock code is generated by the digital security system and provided to a product manufacturer.

17. The method of claim 16, wherein the unlock code generated by the digital security system is provided to the product manufacturer in lieu of the unique activation code.

18. The method of claim 10, wherein generating the unlock code for the given electronic product to be protected comprises hashing the unique activation code assigned to the given electronic product.

19. The method of claim 10, wherein the unique activation code is a clear text alphanumeric string.

20. The method of claim 10, wherein assigning the unique activation code, the unique product identification code, and the unique product scan code to the given electronic product comprises linking the unique activation code, the unique product identification code, and the unique product scan code with the corresponding electronic device to be protected in a database.

21. The method of claim 10, wherein providing to the purchaser the unique activation code assigned to the locked electronic product being purchased comprises the merchant retrieving the unique activation code assigned to the locked electronic product from a security database and the merchant providing the retrieved unique activation code to the purchaser of the locked electronic product.

22. The method of claim 10, wherein providing to the purchaser the unique activation code assigned to the locked electronic product being purchased comprises, the user logging into a website with information provided at the point of purchase to retrieve the unique activation code assigned to the locked electronic product from a security database.

23. The method of claim 10, wherein generating the hash string from the entered unique activation code comprises unlock circuitry in the locked electronic product applying the hash function to the entered unique activation code.

24. The method of claim 10, wherein generating a hash string from the entered unique activation code comprises the locked electronic product providing the entered unique activation code to a security system via a communication network, the security system applying a hash function to the unique activation code to generate the hash string, and the security system returning the hash string to the locked electronic product.

25. The method of claim 24, wherein the generated hash string is compared to the unlock code by the digital security circuit in the locked electronic product.

26. The method of claim 24, wherein the generated hash string is compared to the unlock code by the digital security circuit in the locked electronic product.

27. The method of claim 10, further comprising the user entering the unique activation code into the purchased electronic product via a GUI of the purchased electronic product.

28. The method of claim 27, wherein generating the hash string from the entered unique activation code comprises the digital security circuit of the purchased electronic product hashing the entered activation code to create the unlock code.

29. The method of claim 28, wherein comparing the generated hash string with the hash string embedded in the locked electronic product comprises the digital security circuit of the purchased electronic product comparing the unlock code with the embedded hash string to determine if they match.

30. The method of claim 27, further comprising the electronic product sending the unique activation code to a server and wherein generating the hash string from the unique activation code comprises the server hashing the unique activation code to create the unlock code.

31. The method of claim 30, wherein comparing the generated hash string with the hash string embedded in the locked electronic product comprises the digital security circuit of the purchased electronic product comparing the unlock code with the embedded hash string to determine if they match.

32. The method of claim 10, further comprising the user entering the unique activation code via a GUI of the purchased electronic product, a GUI of an electronic device to which the purchased electronic product is communicatively coupled, or other online access.

33. The method of claim 10, further comprising the purchased electronic product updating a server to reflect that the purchased electronic product has been sold and activated.

34. The method of claim 10, further comprising the user communicatively coupling the purchased electronic product to another electronic device and the user entering the unique activation code via a GUI of the other electronic device.

* * * * *